Oct. 16, 1934.   A. L. PARKER   1,977,241
TUBE COUPLING
Filed April 29, 1933
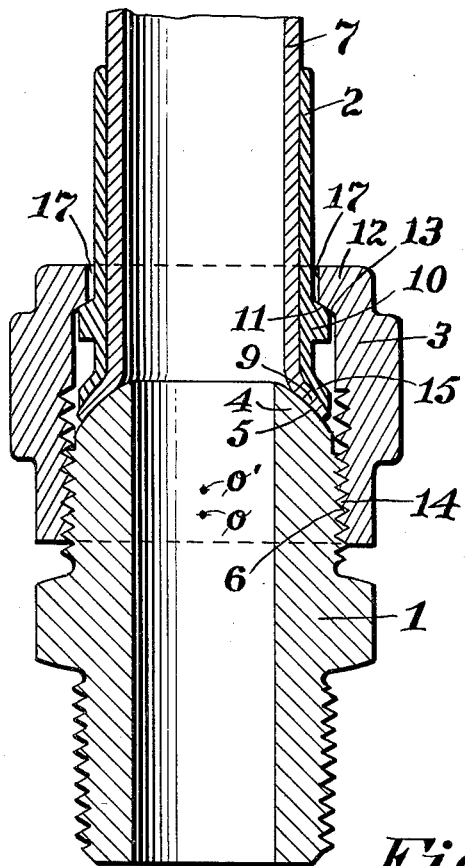
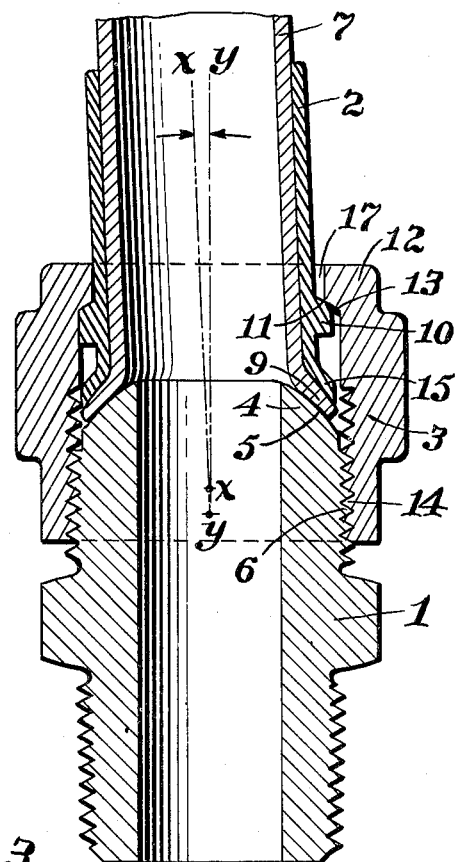
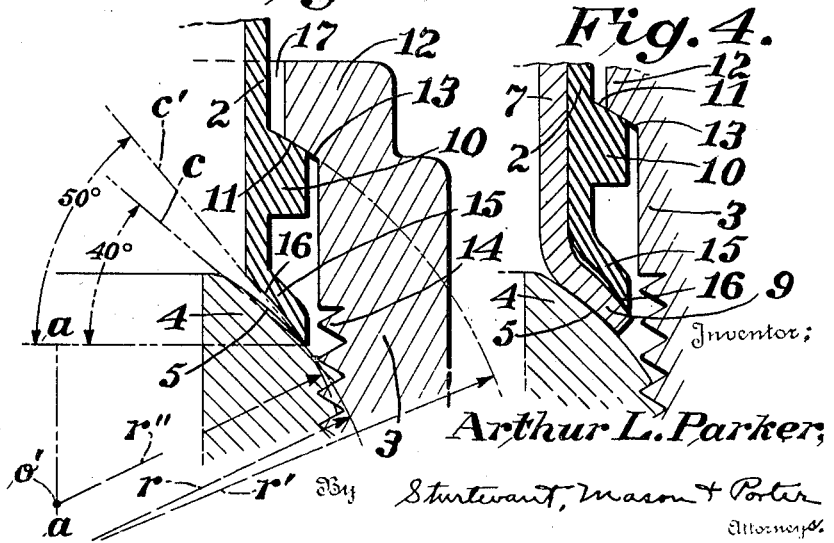
Arthur L. Parker, Inventor
By Sturtevant, Mason & Porter
Attorneys Patented Oct. 16, 1934

1,977,241

UNITED STATES PATENT OFFICE 1,977,241

TUBE COUPLING

Arthur L. Parker, Cleveland, Ohio

Application April 29, 1933, Serial No. 668,643

2 Claims. (Cl. 285—86)

The invention relates to new and useful improvements in tube couplings and more particularly to a tube coupling for clamping the flared end of a tube.

In my prior Patent #1,893,442, granted January 3, 1933, there is shown a tube coupling for clamping the flared end of a tube, wherein the female member is formed with an inner sleeve section having a tapered seat adapted to engage the outer face of the flared end of the tube, and this inner sleeve section is forced into gripping contact with the flared end of the tube by an outer section which is threaded on to a male member.

The present invention has to do with an improvement in the construction of the inner sleeve member and the shaping of the seats for clamping the flared end of the tube. An object of the invention is to provide a clamping sleeve which gives a greater range of tolerance between the inner sleeve clamping the tube end and the outer threaded sleeve which forces said inner sleeve into contact with said tube end. A further object of the invention is to provide a coupling of the above type wherein the tube end is clamped between spherical seats normally shaped on the same radius, but about different centers, so that the clamping portion of the inner sleeve member will yield when forcing the tube end into contact with the seat on the male member, and through the resiliency of the metal, maintain a firm gripping contact thereon.

In the drawing—

Figure 1 is a vertical sectional view through a coupling embodying the improvements, and showing the tube clamped so that the longitudinal axis of the tube is substantially in alinement with the longitudinal axis of the coupling;

Fig. 2 is a view similar to Fig. 1, but showing the tube clamped by the coupling, so that the longitudinal axis of the tube is at an angle to the longitudinal axis of the coupling;

Fig. 3 is a detail in section showing the construction of the inner end of the clamping sleeve and also the construction of the seats which clamp the tube end, and Fig. 4 is a detail section similar to Fig. 3, but showing the parts brought into initial contact, and before being fully clamped down.

The invention is directed to an improvement in the triple coupling shown in my prior Patent #1,893,442, and has to do particularly with the construction of the inner sleeve of the female member and the shaping of the seats on said sleeve and also on the male member, between which the flared end of the tube is clamped. It is thought that the invention will be better understood by a detail description of the present illustrated embodiment thereof, it being understood, however, that the invention may be embodied in other structures.

The coupling consists of a male member 1 and a female member which includes an inner sleeve section 2 and an outer sleeve section 3. The male member 1 is provided with a projecting portion 4 having a tube clamping seat 5 which is spherical. The center of the spherical seat lies in the line $a, a$ at the point where the radius line $r$ intersects the same. This center is indicated at $o$ in Fig. 1. The male member is provided with threads which are indicated at 6. The tube 7 which is to be clamped, has the end thereof flared, as indicated at 9. The inner face of the flared end of the tube is preferably made spherical by a proper shaping tool, and said spherical surface is formed on substantially the same radius as the spherical surface of the seat on the male member, so that when the male member is placed in engagement with the tube end, the flared end of the tube will make contact with the spherical seat 5 on the male member. The inner sleeve 2 of the female clamping member is provided with an annular shoulder 10. The outer face 11 of this shoulder is spherical. The radius line of this spherical-shaped shoulder is indicated at $r'$ in Fig. 3. The sleeve at this time is practically in contact with the seat on the male member, and the radius line $r'$ passes substantially through the same center as the radius line $r$. The purpose of this particular shaping of the annular shoulder 10 will appear later. The outer sleeve 3 of the female member is provided with an annular shoulder 12 having the under face 13 thereof shaped similar to the spherical outer face on the annular shoulder 10. The outer sleeve 3 of the female member is provided with threads 14 which engage the threads 6 on the male member for clamping the tube end.

The inner sleeve member 2 has a laterally extending portion 15, the inner face 16 of which is spherical. The radius line of this spherical surface is indicated at $r''$. It will be noted that the center $o'$ of this spherical surface 15 on the inner sleeve is above the center $o$ of the spherical surface of the male member through which the radius line $r$ passes (see Fig. 1), when the parts are in the position shown in Fig. 3, with the outer end of the projecting portion 15 of the inner sleeve substantially contacting with the seat on the male member. When the tube end is flared and given the spherical shape referred to above, it will be thinned slightly, as clearly shown in the drawing. It will be noted that there is considerable space or tolerance between the inner sleeve and the outer sleeve of the female clamping member, which clearance or tolerance is indicated at 17 in the drawing. As shown in Fig. 1, the tube 7 is placed in the coupling with the flared end in contact with the male member, and is positioned so that its longitudinal axis is substantially in alinement with the longitudinal axis of the coupling. The clearance space 17 is substantially equally divided at both sides of the coupling. In Fig. 2 of the drawing, the tube 7 is shown as placed in contact with the male member so that the longitudinal axis of the tube indicated by the broken line $x$, $x$ is at an acute angle to the broken line $y$, $y$, which in turn indicates the longitudinal axis of the coupling. The clearance space 17 at the left is completely closed when the parts are arranged as shown in Fig. 2. The seat on the male member being spherical, permits of this shifting of the tube without disturbing the contact between the tube end and the seat on the male member. The shoulder 11 is made spherical about substantially the same center, so that when the inner sleeve section of the female member is in this angular position, still the shoulders on the outer section of the female member may firmly clamp the annular shoulder 10 all the way around, and at the same time permit the two threaded sections to be properly engaged and turned to bring about the clamping of the tube end against the seat on the male member. It is to be noted that the female member will be forced into clamping position against the flared end of the tube with a uniform pressure all the way around, whether the tube is in alinement with the coupling, as shown in Fig. 1, or whether it is slightly out of alinement with the coupling, as shown in Fig. 2.

Referring again to Fig. 3, it is noted that the cord of the spherical surface on the male member lies in the line $c$ which is at an angle of substantially forty degrees to a plane at right angles to the longitudinal axis of the coupling. It will also be noted that before the tube is clamped, the cord of the spherical surface 16 lies in the line $c$, cutting the plane at right angles to the longitudinal axis of the coupling, at an angle of substantially fifty degrees. When, however, the sleeve 2 is forced against the flared end of the tube by the turning of the coupling parts, the projecting portion 15 will yield, causing the seat 16 to make intimate contact with the outer flared face of the tube end. The tube end will, therefore, be firmly clamped against the seat on the male member throughout substantially the entire extent of the seats, and the female member will grip the tube end resiliently. The outer face of the tube end is likewise substantially spherical, and this is what insures a substantially intimate contact between said outer face and the inner spherical face 16 on the clamping sleeve.

From the above it will be apparent that I have provided a coupling for tubes wherein there may be provided considerable tolerance or clearance so that the tube which is clamped may be slightly out of line of the longitudinal axis of the coupling and a firm clamping of the tube accomplished. Furthermore, even though the clamping sleeve is at an angle to the longitudinal axis of the body portion of the coupling, the outer sleeve of the female member may be positioned so as to properly engage the threads on the male member, and when these two parts are turned into engagement with each other, there will be a uniform pressure applied to the clamping sleeve all the way around, through the engagement of the spherical shoulder on the outer sleeve of the female member with the spherical shoulder on the inner sleeve of said female member.

It is obvious that minor changes in the details of construction may be made without departing from the spirit of the invention as set forth in the appended claims.

Having thus described the invention, what I claim as new and desire to secure by Letters Patent, is—

1. A tube coupling comprising male and female members having threaded engagement with each other, said male member having a spherical seat adapted to extend into the flared end of the tube, said female member being formed with inner and outer sleeve sections telescoping each other with a clearance space between, said inner section having an annular shoulder the outer face of which is spherical, and said outer section of the sleeve having an annular shoulder the inner face of which is spherical and corresponds to the spherical surface on the annular shoulder of the inner sleeve so as to overlie and contact therewith regardless of the angular position of the inner sleeve relative to the outer sleeve, said inner sleeve having a projecting portion adapted to contact with the outer face of the tapered end of the tube for clamping the same against the spherical seat on the male member said spherical surface of the seat on the male member and said spherical surfaces of the contacting shoulders being curved about centers which are substantially coincident when the coupling members are joined and clamping a tube end.

2. A tube coupling comprising male and female members having threaded engagement with each other, said male member having a spherical seat adapted to extend into the flared end of the tube, said female member being formed with inner and outer sleeve sections telescoping each other with a clearance space between, said inner section having an annular shoulder the outer face of which is spherical and said outer section of the sleeve having an annular shoulder the inner face of which is spherical and corresponds to the spherical surface on the annular shoulder of the inner sleeve so as to overlie and contact therewith regardless of the angular position of the inner sleeve relative to the outer sleeve, said inner sleeve having a projecting portion, the inner face of which is initially spherical with the center thereof so disposed relative to the center of the spherical seat on the male member that the outer extreme portion of said spherical seat on said sleeve will first contact with the outer face of the flared end of the tube whereby said clamping portion of the sleeve will be flexed as it is forced into clamping contact with the outer face of the tube.

ARTHUR L. PARKER.